United States Patent [19]
Inaba

[11] Patent Number: 5,754,265
[45] Date of Patent: May 19, 1998

[54] LIQUID CRYSTAL DEVICE

[75] Inventor: Yutaka Inaba, Kawaguchi, Japan

[73] Assignee: Canon Kabushiki Kaisha, Tokyo, Japan

[21] Appl. No.: 616,759

[22] Filed: Mar. 15, 1996

Related U.S. Application Data

[63] Continuation of Ser. No. 91,123, Jul. 14, 1993, abandoned.

[30] Foreign Application Priority Data

Jul. 15, 1992 [JP] Japan ................... 4-209424

[51] Int. Cl.$^6$ ............... G02F 1/1337; G02F 1/13
[52] U.S. Cl. .................... 349/129; 349/172
[58] Field of Search ............ 359/100, 76; 349/129, 349/172

[56] References Cited

U.S. PATENT DOCUMENTS

| | | | |
|---|---|---|---|
| 4,778,259 | 10/1988 | Kitayama et al. | 350/350 S |
| 4,878,740 | 11/1989 | Inaba et al. | 350/337 |
| 4,932,757 | 6/1990 | Hanyu et al. | 350/339 R |
| 4,932,758 | 6/1990 | Hanyu et al. | 350/350 S |
| 5,013,137 | 5/1991 | Tsuboyama et al. | 350/333 |
| 5,109,295 | 4/1992 | Sato et al. | 359/100 |
| 5,130,050 | 7/1992 | Hagiwara et al. | 252/299.01 |
| 5,165,076 | 11/1992 | Tsuboyama et al. | 359/75 |
| 5,184,847 | 2/1993 | Suzuki et al. | 252/299.65 |
| 5,189,536 | 2/1993 | Hanyu et al. | 359/56 |
| 5,207,947 | 5/1993 | Suzuki et al. | 252/299.67 |
| 5,212,575 | 5/1993 | Kojima et al. | 359/82 |
| 5,223,963 | 6/1993 | Okada et al. | 359/78 |
| 5,310,500 | 5/1994 | Aihara et al. | 252/299.62 |

FOREIGN PATENT DOCUMENTS

| | | | |
|---|---|---|---|
| 63-192023 | 8/1988 | Japan | 359/100 |
| 2-071225 | 3/1990 | Japan . | |
| 3-242624 | 10/1991 | Japan . | |

OTHER PUBLICATIONS

Ouchi et al. "Switching Process in Ferroelectric Liquid Crystals; Disinclination Dynamics of the Surface Stabilized States," Jap. Journal of Applied Physics, vol. 26, No. 1 (Jan. 1987), pp. 1–14.

*Primary Examiner*—Anita Pellman Gross
*Attorney, Agent, or Firm*—Fitzpatrick, Cella, Harper & Scinto

[57] ABSTRACT

A liquid crystal device utilizing a stably retained bookshelf structure is constituted by disposing a ferroelectric liquid crystal layer between a pair of substrates. The ferroelectric liquid crystal layer includes a first liquid crystal region in a first uniform state wherein liquid crystal molecules assume one stable state, a second liquid crystal region in a second uniform state wherein, liquid crystal molecules assume another stable state, and a third liquid crystal region in a twist state disposed between the first and second liquid crystal regions. Liquid crystal molecules at both substrate boundaries are controlled to have mutually opposite pre-tilt directions, and a disclination is formed between the first and second liquid crystal regions.

20 Claims, 10 Drawing Sheets

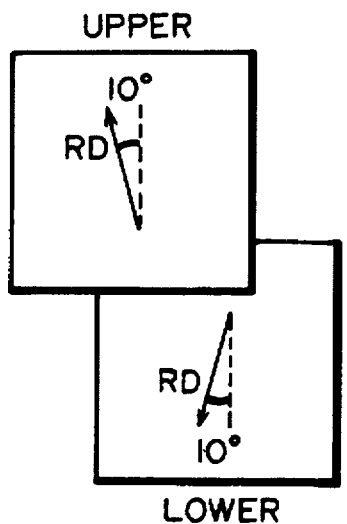
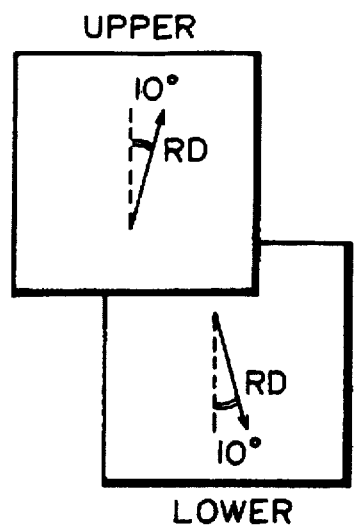
FIG. 16A  FIG. 16B
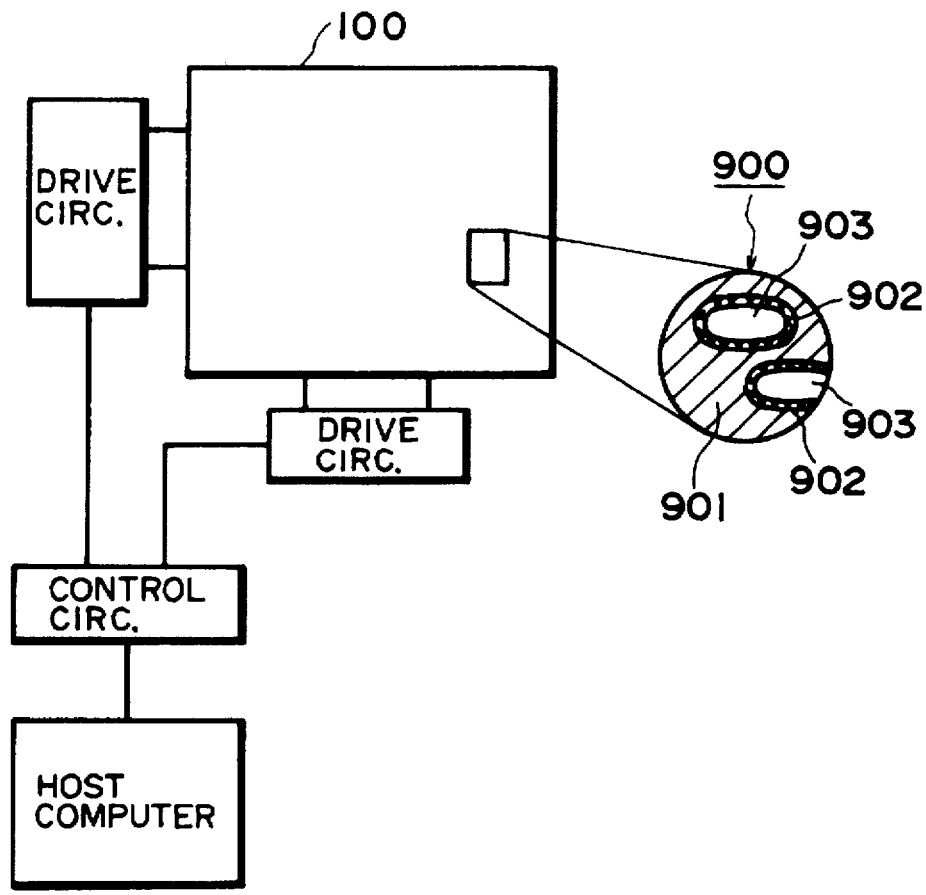
FIG. 17

LIQUID CRYSTAL DEVICE

This application is a continuation, of application Ser. No. 08/091,123, filed Jul. 14, 1993, now abandoned.

FIELD OF THE INVENTION AND RELATED ART

The present invention relates to a liquid crystal device used in an liquid crystal display apparatus, such as a television receiver, a view finder of a video camera, a monitor of a computer terminal, etc., a light valve for a liquid crystal printer, or the like.

There is known a surface-stabilized ferroelectric liquid crystal (hereinafter sometimes abbreviated as "SSFLC") cell or device, which comprises a pair of substrates disposed with a small gap on the order of 1 μm therebetween and a ferroelectric liquid crystal disposed between the substrates so as to release the helical structure of the ferroelectric liquid crystal due to the control of the boundary surfaces of the substrates and to utilize inversion of the spontaneous polarization which is a characteristic of the ferroelectric liquid crystal.

There are also known several types of alignment states of the ferroelectric liquid crystal. Among these, FIG. 1 illustrates a twist alignment state at (a) and a uniform alignment state at (b).

In the twist state (a), the spontaneous polarizations (Ps) indicated by arrows of liquid crystal molecules 106 at an upper substrate 104 and liquid crystal molecules 107 at a lower substrate 105 are both directed outwardly, i.e., toward the substrates, or both directed inwardly, i.e., toward the bulk of the liquid crystal (not shown), and the liquid crystal molecules within the bulk of the liquid crystal are twisted correspondingly. This twist state provides only a very low contrast between white and black states when combined with cross nicol polarizers.

On the other hand, in the uniform state (b), the spontaneous polarizations (Ps) of liquid crystal molecules at the pair of substrate 104 and 105 are directed outwardly at one substrate and directed inwardly at the other substrate, and liquid crystal molecules within the bulk of the liquid crystal are oriented in alignment with the liquid crystal molecules at the substrate boundaries. The liquid crystal in such an alignment state is disposed in a plurality of liquid crystal molecular layers 108 each composed of plural liquid crystal molecules.

The uniform state as shown at FIG. 1(b) in an ideal alignment state but it is difficult to stably develop such an alignment state. For this reason, a chevron state as shown in FIG. 2 has been adopted as a commercially feasible state. FIG. 2 is a schematic view illustrating a liquid crystal molecular alignment state in a chevron structure. In this structure, there are totally four alignment states including two twist states (a) and two uniform states (b) (as described in Japanese Laid-Open Patent Appln. (JP-A) 3-242624).

In the chevron structure, however, the liquid crystal molecular layers 108 in smectic phase are bent as shown at FIG. 2C, so that liquid crystal molecules show a low apparent tilt angle, thus providing a difficulty in realizing a high transmittance.

In FIGS. 1 and 2, reference numerals 101 denotes a C director representing a liquid crystal molecule position or orientation, 102 denotes a cone representing a liquid crystal molecular movement, 103 denotes a bottom face of the cone, 104 and 105 denote the boundaries of the upper and lower substrates, respectively, and 106 and 107 denote liquid crystal molecules (indicated by C-directors) at the upper and lower substrate boundaries, respectively.

The C director 101 represents a projection of a liquid crystal molecule onto a smectic layer, i.e., a liquid crystal molecular layer in smectic phase. In the alignment states shown in FIGS. 1 and 2, liquid crystal molecules are aligned at the substrate boundaries with a prescribed pre-tilt angle.

In order to provide a liquid crystal device with improved properties, inclusive of an increased contrast ratio, it has been tried to adopt an oblique bookshelf structure as shown in FIG. 3 instead of the chevron structure. In the oblique bookshelf structure, however, it has been difficult to stabilize liquid crystal molecular alignment states at adjacent pixels, particularly in case where one of a pair of adjacent pixels shows a bright state and the other pixel shows a dark state.

Further, in case where the above difficulty is obviated by applying an increased electric field which is substantially higher than the threshold, there results in another technical problem, such as a lowering in switching characteristic, i.e., a lower speed of switching of liquid crystal molecules from one stable state to the other stable state.

SUMMARY OF THE INVENTION

In view of the above-mentioned technical problems, an object of the present invention is to provide a liquid crystal device capable of forming a stable liquid crystal molecular alignment state without deteriorating the switching characteristic.

According to a generic aspect of the present invention, there is provided a liquid crystal device wherein a prescribed twist state is formed to cause a disclination between a liquid crystal molecular region assuming one stable state in the uniform state and a liquid crystal molecular region assuming the other stable state.

According to a more specific aspect of the present invention, there is provided a liquid crystal device, comprising a pair of substrates and a ferroelectric liquid crystal layer disposed between the substrates; said ferroelectric liquid crystal layer including a first liquid crystal region in a first uniform state wherein liquid crystal molecules assume one stable state, a second liquid crystal region in a second uniform state wherein liquid crystal molecules assume another stable state, and a third liquid crystal region in a twist state disposed between the first and second liquid crystal regions; wherein liquid crystal molecules at both substrate boundaries have mutually opposite pre-tilt directions, and a disclination is formed between the first and second liquid crystal regions.

According to the present invention, in a liquid crystal device having an alignment state of the oblique bookshelf structure provided with mutually different liquid crystal molecular pretilt angle directions at the upper and lower substrate boundaries, a disclination is caused to be present between a portion of the liquid crystal in one stable state (e.g., providing a bright state) and a portion of the liquid crystal in the other stable state (e.g., providing a dark state), so that the respective stable states are well retained, thus providing a liquid crystal device showing a high bright-dark contrast ratio and being less liable to cause crosstalk between pixels.

In the liquid crystal field, a disclination has been generally considered as occurring due to an alignment defect, and a great effort has been exercised to form an alignment state free from a disclination.

On the other hand, during my study regarding the stability of an alignment state of a ferroelectric liquid crystal represented by chiral smectic C phase. I have found that a type of liquid crystal device shows a particularly excellent stability. As a result of further investigation by appropriate selection of liquid crystal materials, aligning treatments and other factors, it has been found that a pair of adjacent portions (regions) having mutually different alignment states provides a stabler liquid crystal device if the alignment states of these regions are not transformed continuously. This tendency is remarkably noticed in the case of the oblique bookshelf structure. Accordingly, it has been found possible to increase the stability by forming a disclination between adjacent regions having different stable states.

As a result of further study, in a liquid crystal device of the oblique bookshelf structure, it has been found that a disclination functions to obstruct a continuous transformation from one stable state of the uniform state to the other stable state of the uniform state, so that the adjacent regions of these two stable states are less liable to interfere with each other, thus providing an increased stability.

On the other hand, in a conventional device, there is only present such a twist state as to continuously link a pair of regions in two different states, thus providing no disclination.

BRIEF DESCRIPTION OF THE DRAWINGS

FIGS. 16A and 16B are schematic views showing structures of standard samples for determining a molecular distortion in a twist state.

FIG. 17 is a diagrammatic view for illustrating a liquid crystal device according to Example 5 of the invention.

DESCRIPTION OF THE PREFERRED EMBODIMENTS

Figure 3:
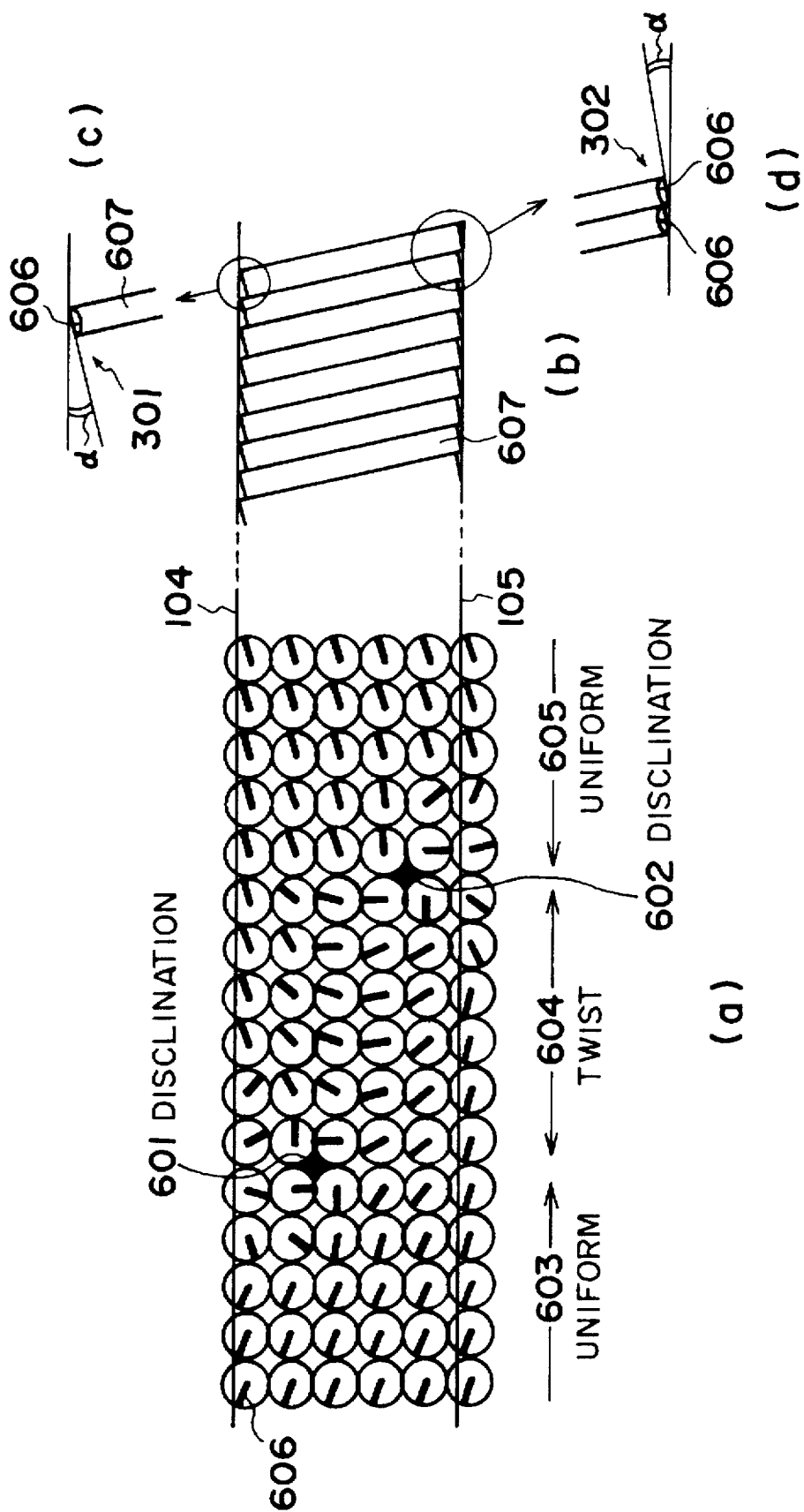
FIG. 3 illustrates an alignment state in an embodiment of the liquid crystal device according to the invention.

FIG. 3 is a schematic view for illustrating an alignment state of liquid crystal molecules in an embodiment of the liquid crystal device according to the present invention.

Referring to FIG. 3, reference numerals 601 and 602 each denote a disclination around which adjacent liquid crystal molecules are disposed to have spontaneous polarization vectors spaced at substantially equal angles. In this case, between regions 603 and 605 in the uniform state and a region 604 in the twist state adjacent to each other, the disclinations 601 and 602 (shown as solid black portions in FIG. 6 and each actually extending in a line perpendicular to the drawing). In FIG. 3, the left region 603 represents a uniform UP state, the central region 604 represents a twist state and the right region 605 represents a uniform DOWN state. The occurrence of a disclination is accompanied with a potential barrier. Accordingly, under such circumstances, the relaxation or transformation of a uniform state to a twist state is suppressed, thus stabilizing the uniform state.

In the present invention, in order to provide such a disclination and allow the use of a liquid crystal material showing a large cone angle, the liquid crystal may preferably be aligned to form an oblique bookshelf structure as shown at FIG. 3(b) together with partially enlarged views FIG. 3(c) and (d), wherein liquid crystal molecules are generally aligned obliquely to the substrate boundaries 104 and 105 with pre-tilts 301 and 302 extending in opposite directions at a pretilt angle α. By adopting such a smectic layer structure, it is possible to provide a larger apparent tilt angle, an increased transmittance, and thus an increased contrast.

Such a disclination used in the present invention may be formed by a combination of a liquid crystal material and an aligning treatment, e.g., as described below.

(1) Pretilt directions are opposite to each other at the upper and lower substrate boundaries. The liquid crystal has a negative spontaneous polarization, is caused to have outward directions of spontaneous polarization at both substrate boundaries (toward the substrates) in the twist state and has a helical winding of a left-hand screw in a chiral smectic layer.

(2) Pretilt directions are opposite to each other at the upper and lower substrate boundaries. The liquid crystal has a positive spontaneous polarization, is caused to have inward directions of spontaneous polarization at both substrate boundaries (toward the liquid crystal) in the twist state and has a helical winding of a left-hand screw in a chiral smectic layer.

Including the above types (1) and (2), four types of combinations as shown in the following Table 1 may be used in the present invention.

TABLE 1

| Type | (1) | (2) | (3) | (4) |
|---|---|---|---|---|
| Alignment treatment | | | | |
| pretilt directions | opposite | opposite | opposite | opposite |
| Directions of Ps at boundaries | outward | inward | inward | outward |
| Liquid crystal material | | | | |
| Sign of Ps | negative | positive | negative | positive |
| Helical winding direction | left-hand | left-hand | right-hand | right-hand |

In case where the C directors at both substrates are different from each other by nearly 180 degrees so that the elastic energy is not controlling, the helical winding direction of the liquid crystal material determines the twist direction in the twist state as will be described below.

Figure 4:
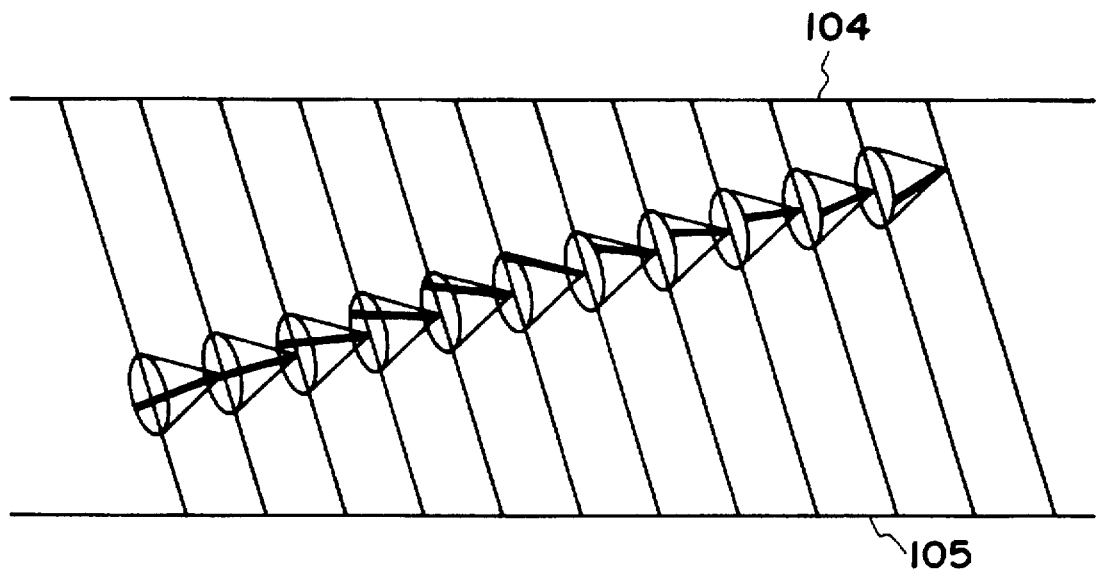
FIG. 4 illustrates a helical structure of liquid crystal molecules.

The liquid crystal molecules extending in the layer normal direction are twisted clockwise from the lower substrate to the upper substrate as illustrated in FIG. 4 if the liquid crystal has a right-hand screw helical winding. Correspondingly, the C directors in a smectic layer are twisted clockwise from the lower substrate 105 to the upper substrate. On the other hand, if the helical winding direction is reverse (a left-hand screw), the twist direction is reversed, i.e., counterclockwise.

Figure 5:
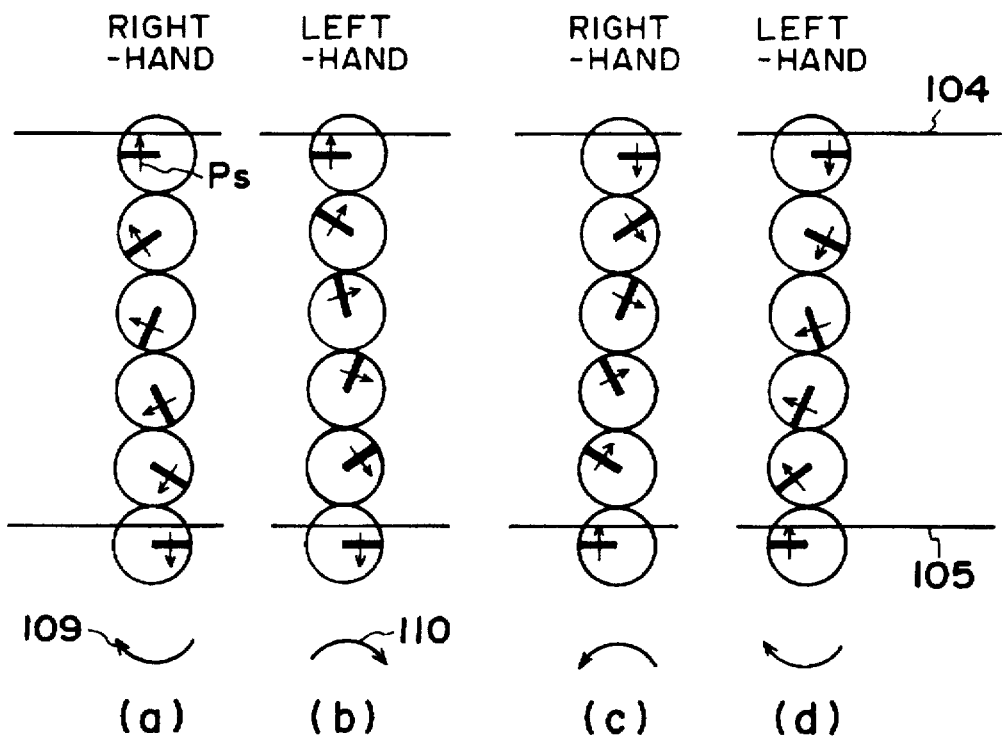
FIG. 5 illustrates twist states of a liquid crystal having a negative spontaneous polarization.

FIG. 5 illustrates four twist states (a)–(d) of liquid crystal molecules each having a negative spontaneous polarization. At (a) and (b) are shown cases where the liquid crystal has an outwardly directed spontaneous polarization at substrate boundaries in the twist state. At (c) and (d) are shown cases where the liquid crystal has an inwardly directed spontaneous polarization. Further, at (a) and (c) are shown cases where the liquid crystal has a right-hand screw helical winding, and at (b) and (d) are shown cases of a left-hand screw helical winding.

The cases of outward spontaneous polarization directions, i.e., the twist states of FIGS. 5(a) and (b) are taken for example, and it is assumed that each twist state is tentatively placed in the twist state region 604 in FIG. 3 and is tried to be transformed under such conditions that molecules at the boundaries are moved and rotated inwardly on the cones so as not to change (switch) their pretilt directions to examine whether the twist state can be transformed so as to allow smooth or continuous linkage with the two types of uniform state regions 603 and 605 on both sides thereof. Of the twist states at FIGS. 5(a) and 5(b), the one at FIG. 5(a) of a right-hand screw helical winding allows such continuous linkage. On the other hand, the twist state at FIG. 5(b) does not allow such continuous or smooth linkage with the adjacent uniform regions 603 and 605 when placed in the twist state region 604 but are linked with the adjacent uniform regions when accompanied with disclinations (as denoted by 601 and 602 in FIG. 3) at boundaries with the uniform regions. Thus, in the configuration, only a liquid crystal having a left-hand screw helical winding giving a twist state as shown at FIG. 5(b) can stabilize the adjacent two different types of uniform state regions.

On the other hand, in case where the spontaneous polarization directions are inward as shown at FIG. 5(c) and (d), a twist state at FIG. 5(c) is given by a liquid crystal having a right-hand screw helical winding and a twist state at FIG. 5(d) is given by a liquid crystal having a left-hand screw helical winding. Of these states, the one of a right-hand screw helical winding at FIG. 5(c) can stabilize two different uniform states adjacent thereto.

In the above, the cases of the liquid crystal having a negative spontaneous polarization have been explained but, also in the cases of liquid crystals having a positive spontaneous polarization, identical conclusions can be derived except that the directions are reversed.

Figure 6:
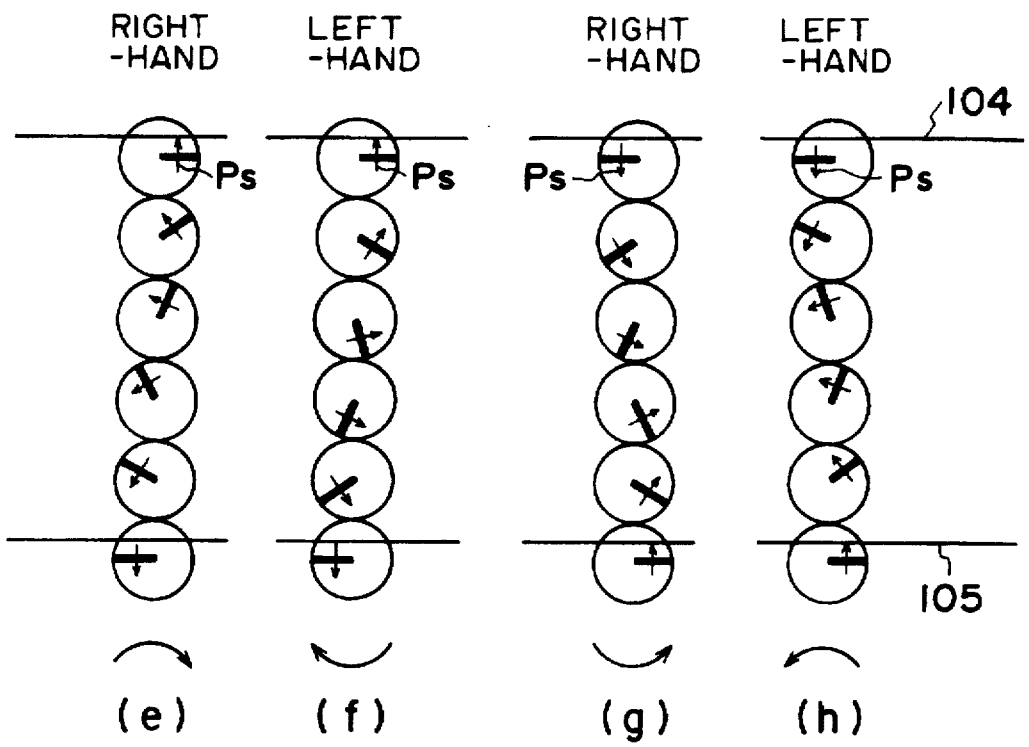
FIG. 6 illustrates twist states of a liquid crystal having a positive spontaneous polarization.

FIG. 6 illustrates four twist states (e)–(h) of liquid crystal molecules each having a positive spontaneous polarization. Compared with FIG. 5, a liquid crystal molecule at the same position has an opposite spontaneous polarization direction (indicated by an arrow).

Also in FIG. 6, at (e) and (f) are shown cases where the liquid crystal has an outwardly directed spontaneous polarization at both substrate boundaries and at (g) and (h) are shown cases of an inwardly directed spontaneous polarization. The helical winding is right-hand screw at (e) and (g) and left-hand screw at (f) and (h). Among these twist states (e)–(h), only the states (e) and (h) can stabilize adjacent two regions of mutually different uniform states when placed between such two regions.

Accordingly, a disclination may be caused to be present between adjacent regions of mutually different two uniform states by selecting the liquid crystal material and the aligning treatment so as to provide a twist state at (b), (c), (e) or (h) among the states shown in FIGS. 5 and 6 and also by disposing a pair of substrates so that the pre-tilt directions at both substrate boundaries are opposite to each other.

Incidentally, in FIGS. 5 and 6 (and also in FIGS. 7–11 as described hereinafter), an arcuate arrow indicated near a substrate like those denoted by 109 and 110 in FIG. 5 represents a twist direction (clockwise or counterclockwise) and a movement direction (leftward or rightward) of C-directions when viewed in the direction of the substrate toward the liquid crystal bulk. For example, the arcuate arrow 110 represents that liquid crystal molecules in the twist state at FIG. 5(b) are twisted clockwise and moved rightward in the direction of from the lower substrate 105 toward the liquid crystal bulk. It would be noted that the cases (b), (c), (e) and (h) shown in FIGS. 5 and 6 and described to stabilize adjacent uniform states are all represented by upwardly convex arcuate arrows.

Next, an explanation is made based on an example as to why the development of a twist state as described above causes a disclination and stabilize the uniform states.

Figure 7:
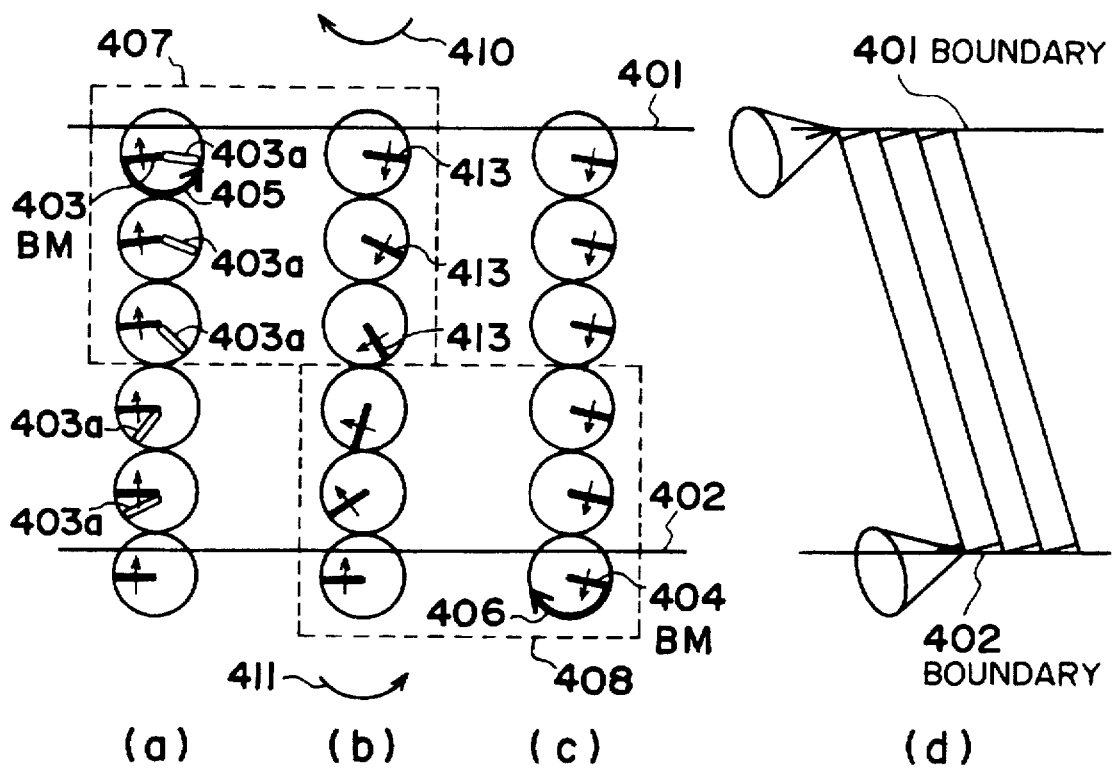
FIG. 7 illustrates an alignment state in a comparative liquid crystal device.
Figure 8:
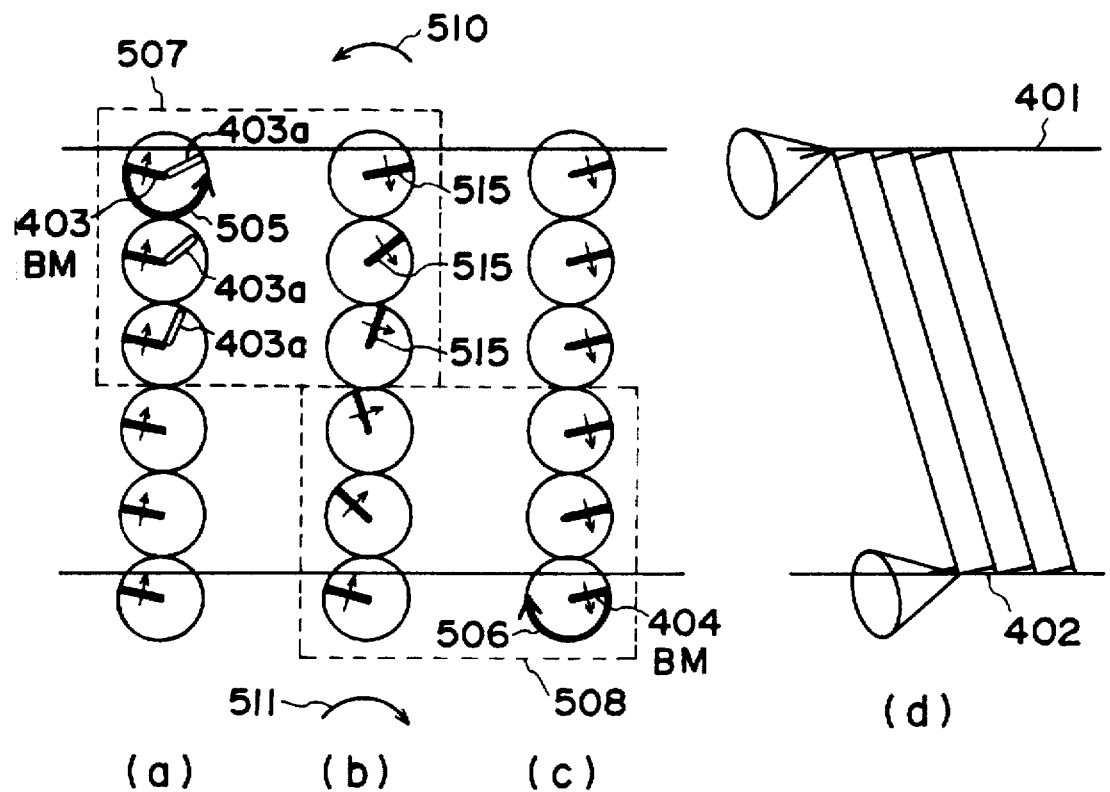
FIG. 8 illustrates an alignment state in an embodiment of the liquid crystal device according to the invention.

FIGS. 7 and 8 are schematic views for illustrating liquid crystal molecular alignment states in a comparative model and an embodiment of the present invention, respectively.

In case where the direction of spontaneous polarization of liquid crystal molecules at the substrate boundaries are fixed to be, e.g., outward, a twist state is more stable than a uniform state. This is because, while the elastic energy attributable to a distortion among molecules is higher in a twist state, the regulation force exerted by the boundaries is generally more predominant. Under such a condition, even if a uniform state is formed by once applying an electric field, the uniform state is gradually relaxed to a twist state after removing the electric field. FIG. 7 illustrates such a behavior. Thus, from two different uniform states at (a) and (c), a boundary molecule (B.M.) 403 at an upper substrate boundary 401 and a boundary molecule (B.M.) 404 at a lower substrate boundary 402 are rotated in the directions of arrows 405 and 406, respectively, to provide a twist state as shown at (b). Corresponding with the rotation of the boundary molecules, inner molecules also rotate accompanying the rotation. As a result, continuous transformation into the twist state is caused. More specifically, in a region 407 on the upper substrate side and the uniform state (a) side, molecules 403 in the uniform state approach to molecular positions 403a identical to the corresponding molecules in the twist state (b) so as to provide a director twist as represented by an arcuate arrow 410 from the upper substrate toward the liquid crystal bulk which twist is opposite to the molecular rotation 405. Such a gradual rotation of liquid crystal molecules is also caused in a region 408 on the lower substrate side and the uniform state (c) side as corresponding to a director twist 411. In order that the uniform states are stably present, the opposite polarization directions must be retained in resistance to the spontaneous polarization determination force as described above. However, as the molecules can rotate without any potential barrier, the opposite polarization directions cannot be retained.

Therefore, in the present invention, there is formed a twist state as shown at FIG. 8(b) which is opposite in twist direction to that shown at FIG. 7(b), so that inner liquid crystal molecules do not continuously rotate or be shifted to the corresponding molecular positions in the twist state at FIG. 8(b) even if boundary molecules 403 and 404 are rotated in the directions of arrows 505 and 506, respectively.

More specifically, in a region 507, the direction 505 in which liquid crystal molecules 403 move toward the other stable state is identical to the twist direction 510 in which liquid crystal molecules are twisted from the upper substrate 401 toward the liquid crystal bulk, so that the liquid crystal molecules in the uniform state do not readily move toward the other stable state.

Explaining in a more readily understandable manner, when the molecules 403 in the region 407 in FIG. 7 move to positions 403a identical to the molecules 413 along a path indicated by the arrow 405 on a cone periphery. In contrast thereto, in the region 507 in FIG. 8, the molecules 403 move along a path indicated by the arrow 505, so that the molecules 403 have to move for longer distances on the cone periphery until they reach the positions 403a identical to the molecules 515 than in the case of FIG. 7. This means that the shift or transformation to the twist state is more difficult in the case of FIG. 8 than FIG. 7.

By forming a twist state as shown in FIG. 8, it is possible to form disclinations as shown in FIG. 3. Thus, disclinations are formed between the twist state and the uniform states in the regions 507 and 508.

Figure 9:
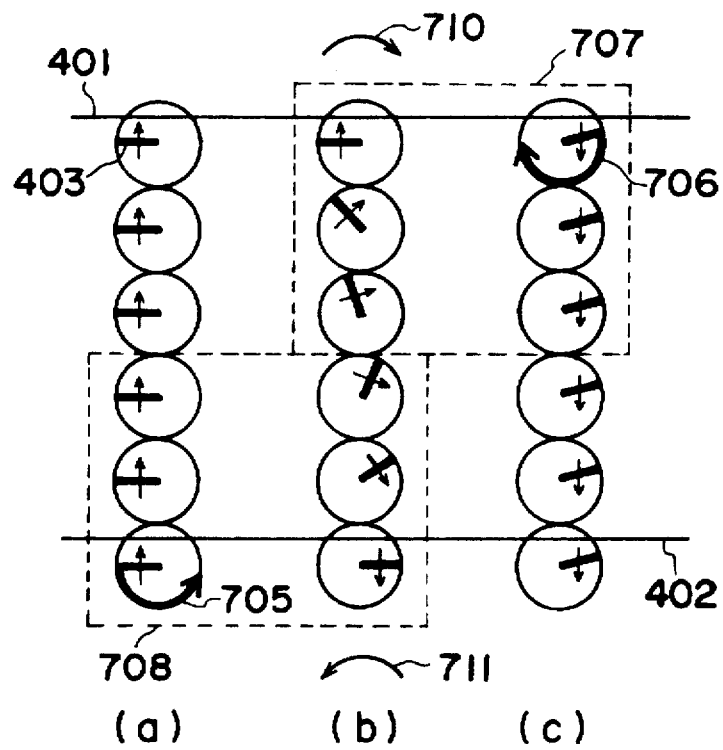
FIGS. 9–11 respectively illustrate an alignment state in another embodiment of the liquid crystal device according to the invention.

FIG. 9 illustrates a case wherein another twist state (b) (different from that shown in FIG. 8(b)) is formed between uniform states (a) and (c). In this case, disclinations are formed between the twist state (b) and the uniform state (c) in a region 707 and between the twist state (b) and the uniform state (a) in a region 708.

Figure 10:
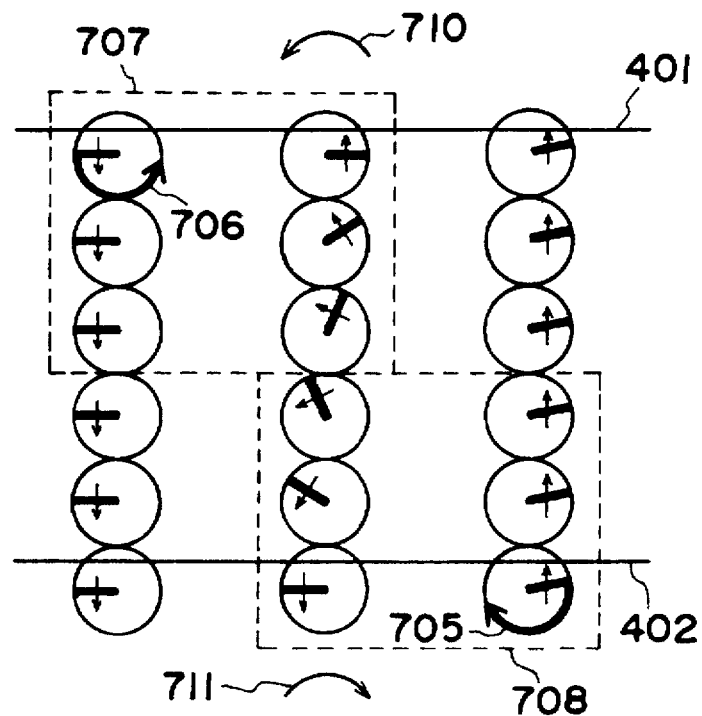
Figure 11:
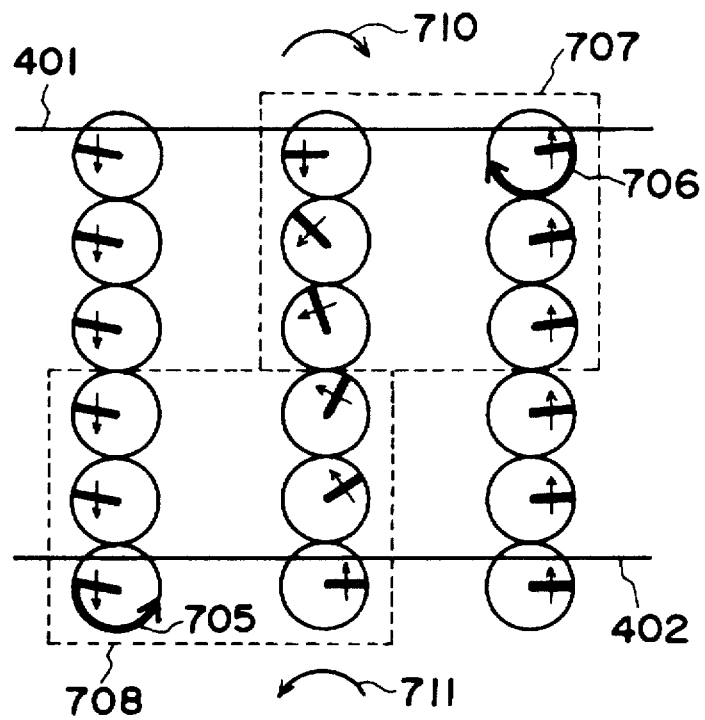

FIGS. 10 and 11 show cases of using a liquid crystal having a positive spontaneous polarization wherein different twist states and different regions of a disclination are formed compared with the cases of FIGS. 8 and 9.

As shown in FIGS. 9–11, in the regions 707 and 708, the directions 706 and 705 in which the molecules in the uniform states move toward the other stable states are identical to the twist directions 710 and 711 from the substrates toward the liquid crystal bulk, so that the molecules in the uniform states do not readily move toward the twist state.

In the case where the liquid crystal device according to the present invention is used in a display apparatus, a twist region 604 along with disclinations 601 and 602 in FIG. 3 may be masked (light-interrupted) to leave only adjacent uniform regions 603 and 605 as discrete pixels, or the three regions 603, 604 and 605 may be disposed within one pixel. The former arrangement is suited for a binary display using monodomains of black and white and the latter arrangement is suited for a gradational display using plural domains with varying areal ratios for controlling the transmittance.

As briefly mentioned above, it is preferred to form smectic layers of a bookshelf structure. In order to form the structure, it is generally preferred to set the pretilt angle as follows.

Figure 1:
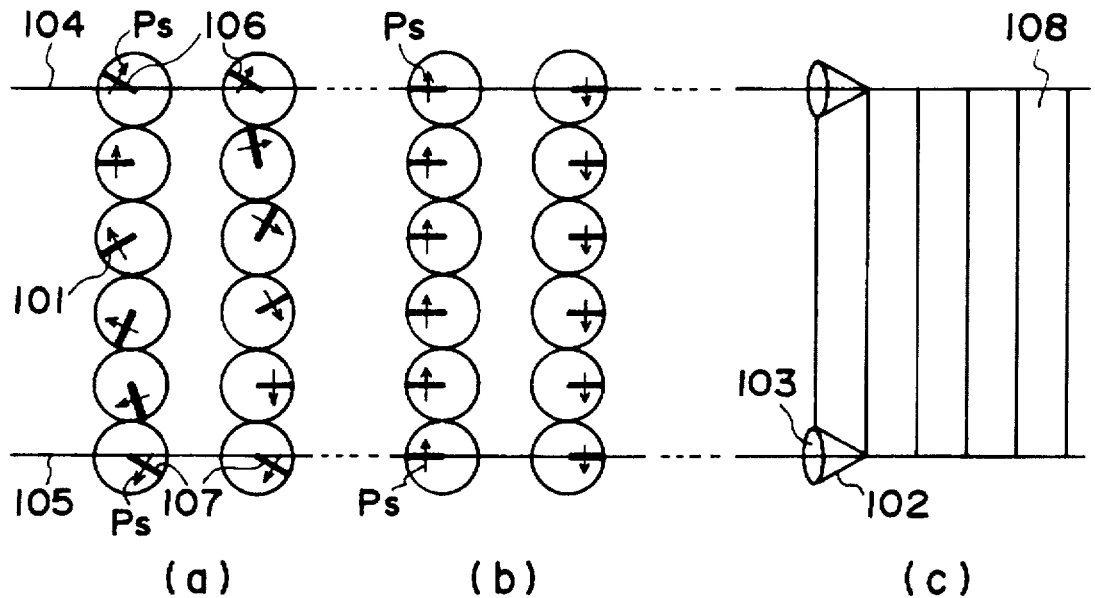
FIG. 1 illustrates a twist state (a) and a uniform state (b) together with a layer structure of a ferroelectric liquid crystal.
Figure 2:
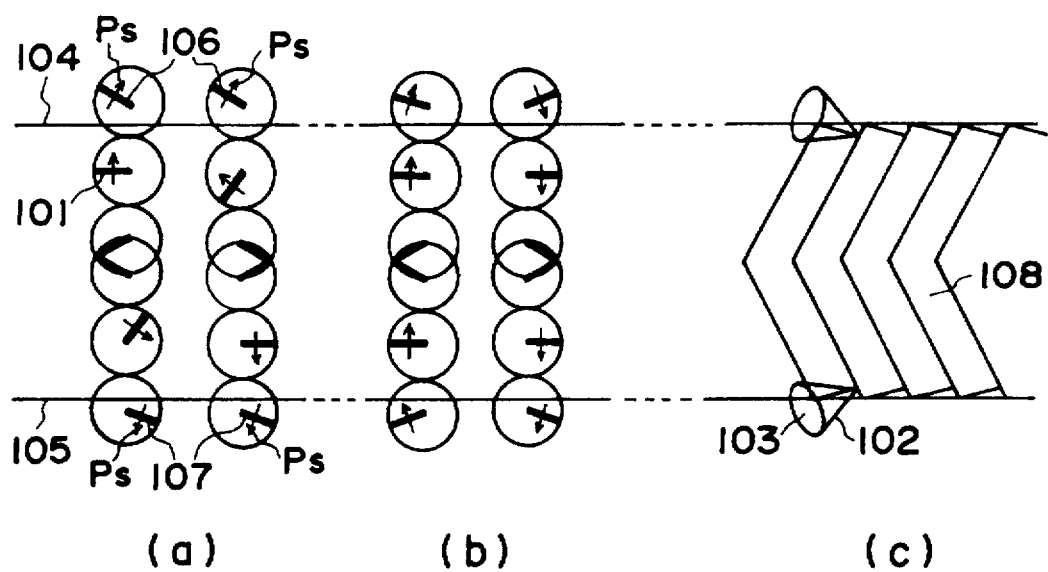
FIG. 2 illustrates a chevron structure of a ferroelectric liquid crystal.
Figure 12:
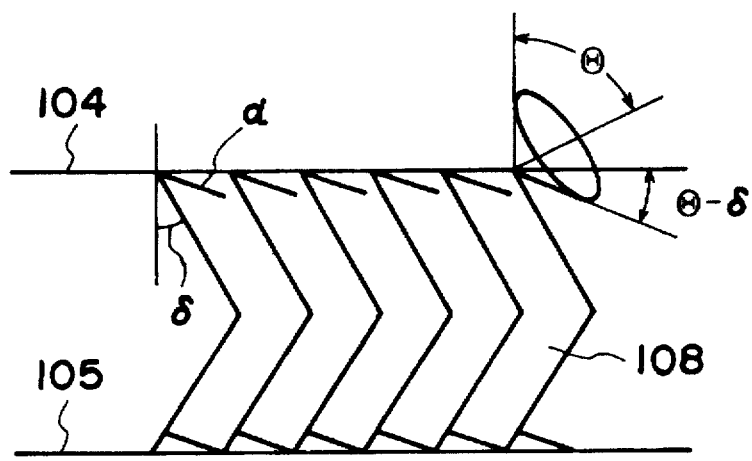
FIG. 12 illustrates a relationship between a pretilt angle α and a smectic layer inclination angle δ of a liquid crystal molecule.

In case where the pretilt directions are identical at both substrates, a chevron structure of a reverse direction to that shown in FIG. 2(c) is formed if a liquid crystal material having a large cone angle is used. On the other hand, even if the pretilt directions are opposite to each other, a chevron structure is still formed if the pretilt angle is too small. More specifically, if the pretilt angle $\alpha$ satisfies a relationship of $\alpha < Ⓗ - \delta$ with a cone angle Ⓗ and a layer inclination angle $\delta$, a chevron structure is allowed as shown in FIG. 12, so that the pretilt angle $\alpha$ should be larger than the above range.

Further, if the pretilt angle is too large, the whole area is occupied with a twist state, so that disclination lines cannot be formed. This is also unsuitable.

It is preferred that the pretilt angle $\alpha$ is set to satisfy a relationship of $$Ⓗ - \delta < \alpha < \delta$$

in order to form the layer structure and alignment state according to the present invention. A practically sufficient transmittance is given, if Ⓗ is 15 degrees or higher, and many liquid crystals show a layer inclination angle $\delta$ which is 0.7–0.9 times Ⓗ. Accordingly, in case of Ⓗ=15 degrees, the pretilt angle $\alpha$ may be set to satisfy 2 degrees $<\alpha<14$ degrees, preferably 5 degrees $<\alpha<11$ degrees by selecting the condition for uniaxial aligning treatment, such a rubbing or oblique vapor deposition.

Suitable conditions are described above, so that values outside the above range may be used in case where a special liquid crystal material or an alignment film is used.

The liquid crystal device according to the present invention may be prepared through a known process, the outline of which will be described hereinbelow.

Figure 13:
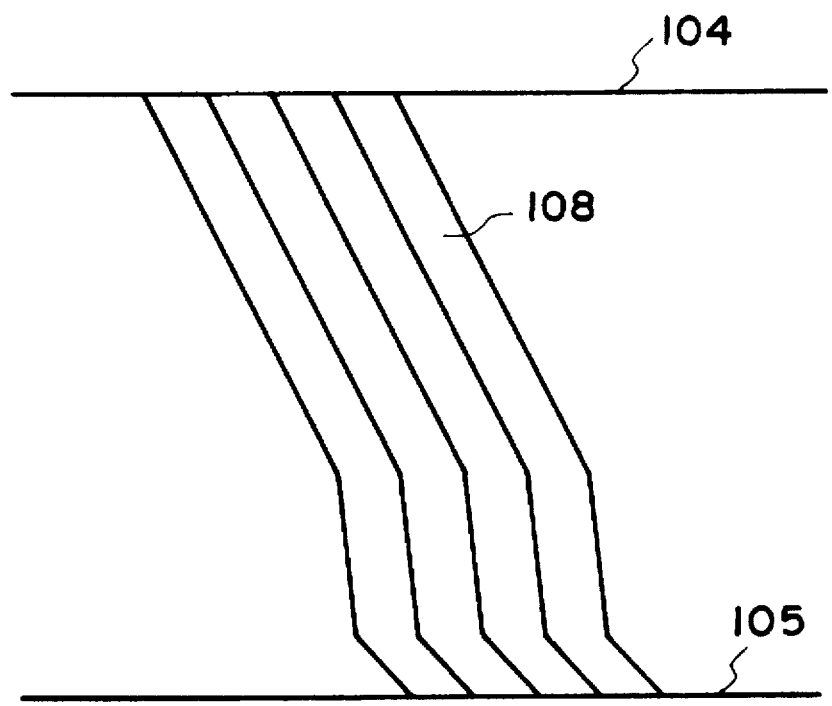
FIG. 13 illustrates a liquid crystal alignment state including bends at two parts in a smectic layer.

First of all, a pair of substrates are provided and respectively subjected to electrode formation and aligning treatment. Then, the pair of substrates are controlled to provide planar positions so as to provide mutually opposite pretilt directions at both substrate boundaries and then affixed to each other with sealing at peripheries while leaving an accurately set spacing on the order of 1–3 μm therebetween, thereby providing a blank cell. Then, a liquid crystal material is applied onto an injection port of the blank cell and injected into the cell. Then, after sealing the injection port, the cell is gradually cooled to cause phase transition to smectic C phase. If the smectic layers 108 are bent at plural (an even-number of) parts between the substrates 104 and 105 as shown in FIG. 13 at this time, the structure may be reformed into an oblique bookshelf structure by applying an AC electric field for a prescribed period or imparting a mechanical strain to the cell.

Whether the spontaneous polarization direction of liquid crystal molecules at substrate boundaries is outward or inward may be examined experimentally in a manner as will be described below with utilization of the fact that the wavelength distribution of transmitted light is different whether the projections of n-directors onto the substrates are twisted counterclockwise (FIG. 5(a), (b) and FIG. 6(g), (h)) or clockwise (FIG. 5(c), (d) and FIG. 6(e), (f)) from the upper substrate toward the lower substrate.

Figure 14:
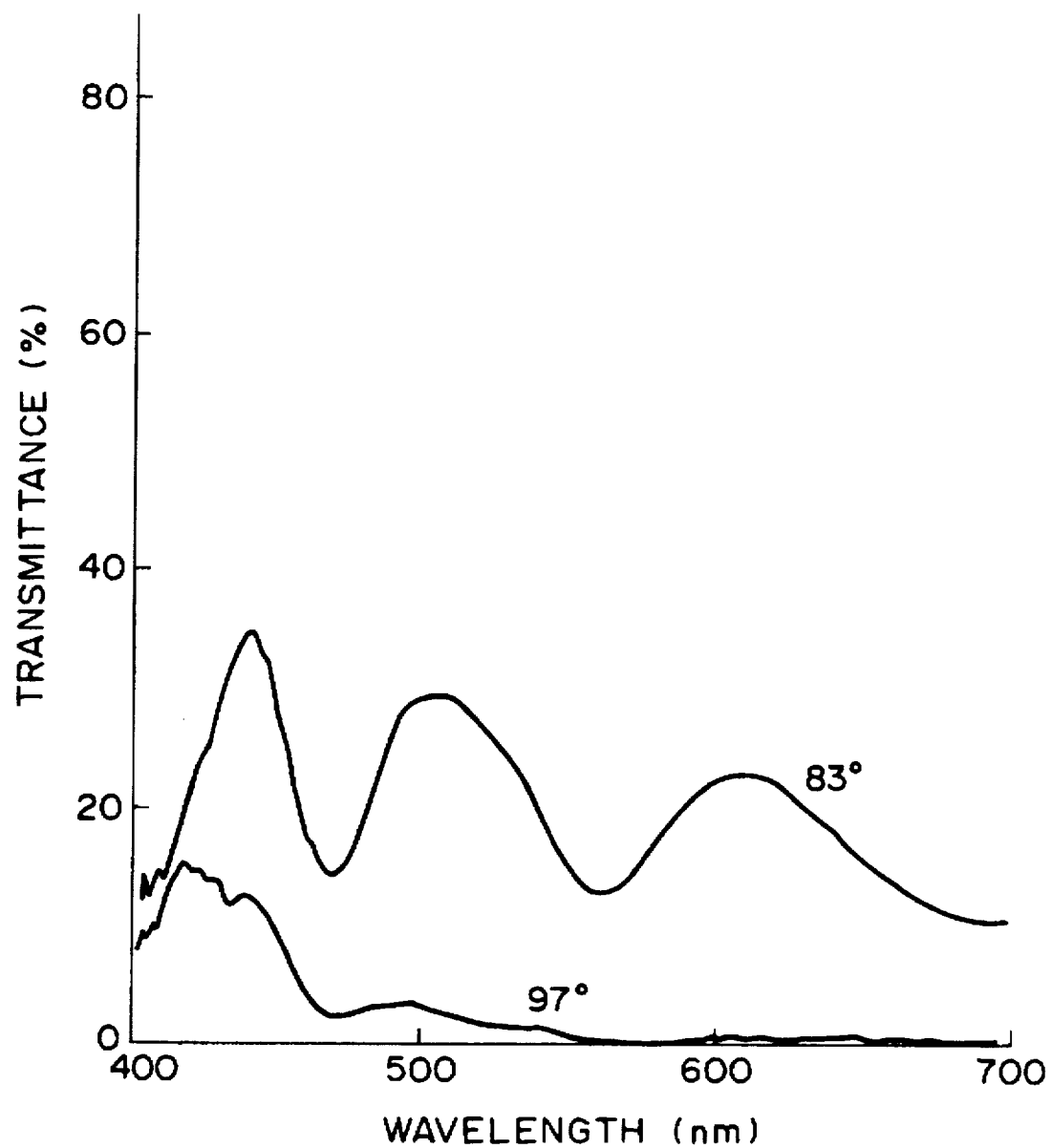
FIGS. 14 and 15 are graphs each showing a spectral transmittance characteristic through a liquid crystal device.

FIG. 14 is a graph showing wavelength characteristics of transmitted light through a twist state region of a liquid crystal device when measured through a polarizing microscope while setting the polarizers to the rubbing direction and setting the analyzer at angles 83 degrees and 97 degrees with respect to the polarizer. The liquid crystal device used for obtaining the characteristics shown in FIG. 14 contained a liquid crystal having a negative spontaneous polarization and liquid crystal molecules showing the spontaneous polarization directed outwardly at both substrate boundaries.

Figure 15:
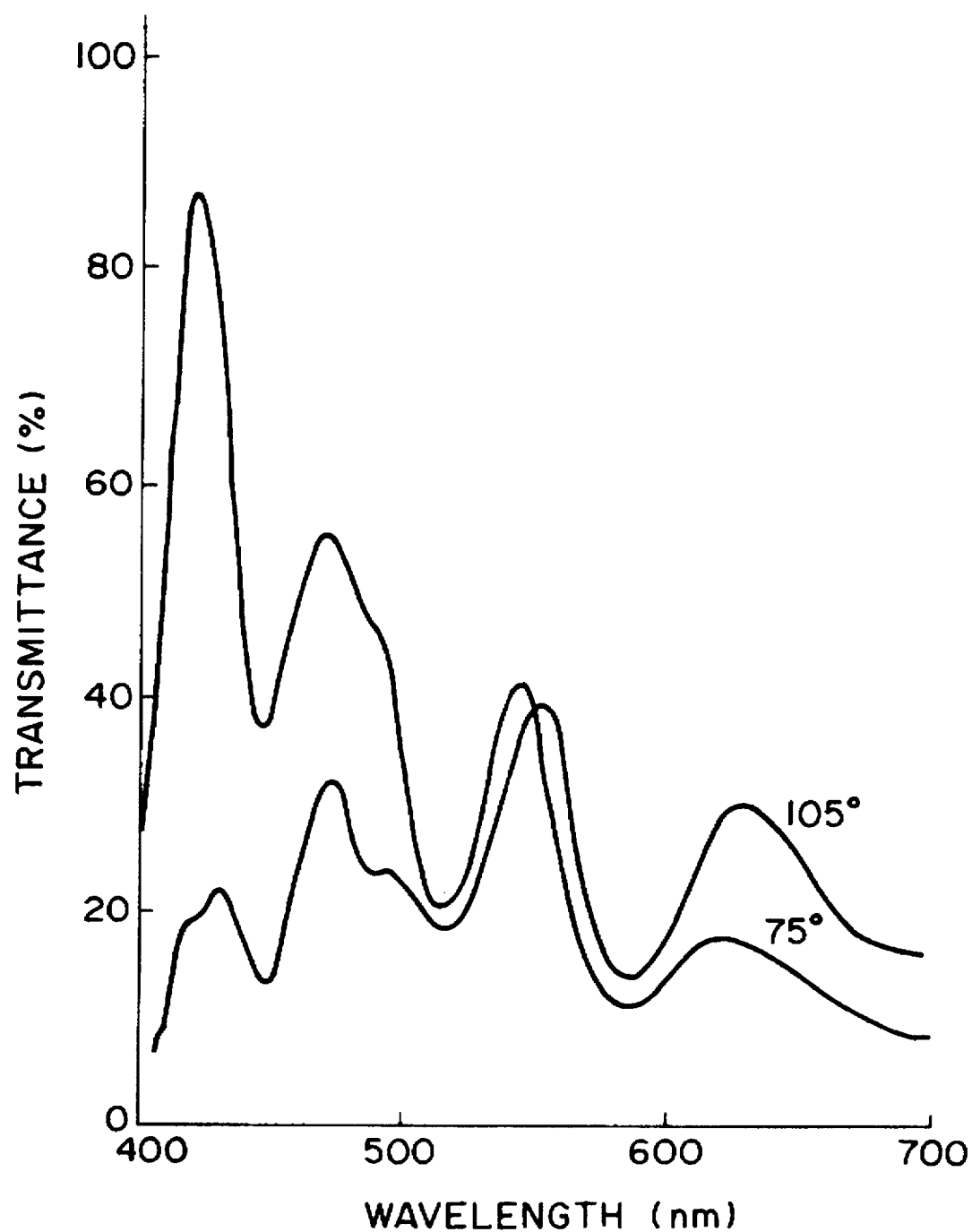

On the other hand, FIG. 15 is a graph showing wavelength characteristics of a liquid crystal device containing liquid crystal molecules showing a negative spontaneous polarization directed outwardly at both substrate boundaries when measured through a polarization microscope while setting the analyzer at angles of 75 degrees and 105 degrees with respect to the polarizer.

In view of the characteristic at an angle exceeding 90 degrees, i.e., at 97 degrees, in FIG. 14 in comparison with the characteristic at an angle exceeding 90 degrees, i.e., at 105 degrees, in FIG. 15, FIG. 14 shows a higher transmittance at a shorter wavelength and a lower transmittance at a longer wavelength, whereas FIG. 15 shows macroscopically similar transmittances over substantially whole wavelength region. Accordingly, the former (FIG. 14) showed a bluish tint and the latter (FIG. 15) showed white color. On the other hand, at an angle below 90 degrees, the former showed white color while the latter showed a bluish tint. In this way, the transmitted light wavelength characteristic at an angle deviated from right-angle cross-nicols reflects the twist direction of n-directors between the substrates (see JP-A 2-71225 for reference).

Accordingly, it is understood that FIGS. 14 and 15 refer to mutually opposite n-director twist directions.

Then, in order to determine the twist directions, two types of standard liquid crystal cell samples were prepared as shown in FIGS. 16A and 16B, in each of which the rubbing directions RD of an upper and a lower substrate were respectively deviated by 10 degrees from their parallel directions, and a racemic liquid crystal showing no ferroelectricity was disposed between the substrates. A racemic liquid crystal has no spontaneous polarization, and therefore molecules thereof at the substrate boundaries are oriented in the respective rubbing directions as shown in FIGS. 16A and 16B. When such standard cell samples were placed between a pair of polarizer and analyzer set in the above-described manner to examine the transmitted light wavelength characteristics. As a result, the cells of FIGS. 14 and 15 showed roughly identical characteristics as the counterclockwise twisted standard cell and the clockwise twisted standard cell respectively.

From these results, the liquid crystal cell containing a liquid crystal of a negative spontaneous polarization and showing the characteristic of FIG. 14 was found to show an outward spontaneous polarization direction at the substrate boundaries, and the liquid crystal cell showing the characteristic of FIG. 15 was found to show an inward spontaneous polarization direction.

Of course, in the case where the liquid crystal has a positive spontaneous polarization, the spontaneous polarization directions at the substrate boundaries are opposite to those described above.

As described above, in the present invention, when neighboring two uniform state regions assume mutually different stable states, the above-mentioned twist state is formed between the two uniform state regions together with formation of disclinations at boundaries between the twist state region and the two uniform state regions.

EXAMPLE 1

700 Å-thick transparent stripe electrodes of ITO (indium tin oxide) were formed on a glass substrate in a width of 220 mm with a spacing of 10 μm, and then coated with a 200 Å-thick polyimide film by using a polyimide precursor ("LQ 1802", mfd. by Hitachi Kasei K.K.). The polyimide film was rubbed with a rubbing roller surfaced with a nylon cloth under the conditions of a roller pressing depth of 0.3 mm and a speed of 1000 rpm.

Two substrates each prepared in the above-described manner were disposed opposite to each other so that their rubbing directions were substantially parallel (crossing angle <3 degrees) and opposite to each other, and the periphery of the substrates were sealed to form a blank cell with a cell gap of about 1 μm, into which the following ferroelectric liquid crystal material (Sample A) was injected in its isotropic phase. The cell was then gradually cooled to cause phase transition to smectic C phase, followed by application of an AC electric field, to prepare a liquid crystal device.

[Sample A]

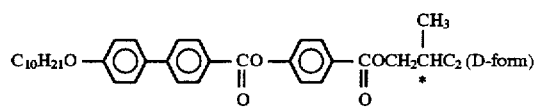

The liquid crystal material (Sample A) showed a left-hand screw helical winding and a negative spontaneous polarization.

Then, the thus-prepared liquid crystal device was examined as to whether liquid crystal molecules at both substrate boundaries show an outward or inward spontaneous polarization direction in the above-described manner.

As a result, the liquid crystal device showed a spectral transmittance characteristic as shown in FIG. 14 and was found to show an outward spontaneous polarization direction at the substrate boundaries.

Then, when adjacent two pixels were brought into bright and dark display states, respectively, by application of prescribed voltages of opposite polarities, a twist state region and disclination lines were formed between the pixels.

EXAMPLE 2

A liquid crystal device was prepared in the same manner as in Example 1 except that the following liquid crystal material (Sample B) was used in combination with 250 Å-thick nylon films as alignment control films.

[Sample B]

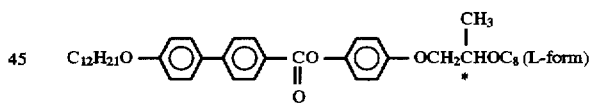

EXAMPLE 3

A liquid crystal device was prepared in the same manner as in Example 1 except that the following liquid crystal material (Sample C) was used in combination with 200 Å-thick nylon films as alignment control films.

[Sample C]

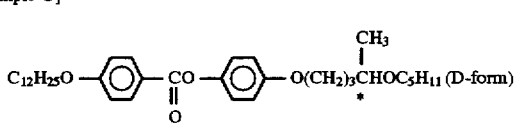

EXAMPLE 4

A liquid crystal device was prepared in the same manner as in Example 1 except that the following liquid crystal material (Sample D) was used in combination with 250

Å-thick polyimide films as alignment control films.

[Sample D]

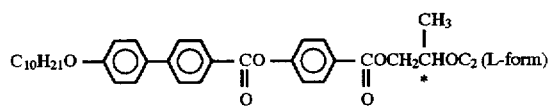

Comparative Example 1

A liquid crystal device was prepared in the same manner as in Example 1 except that the Sample A liquid crystal material was used in combination with 200 Å-thick nylon films as alignment control films.

Comparative Example 2

A liquid crystal device was prepared in the same manner as in Example 1 except that the Sample B liquid crystal material was used in combination with 250 Å-thick polyimide films as alignment control films.

Comparative Example 3

A liquid crystal device was prepared in the same manner as in Example 1 except that the Sample C liquid crystal material was used in combination with 200 Å-thick polyimide films as alignment control films.

Comparative Example 4

A liquid crystal device was prepared in the same manner as in Example 1 except that the Sample D liquid crystal material was used in combination with 250 Å-thick nylon films as alignment control films.

The thus-prepared liquid crystal devices of Examples 1–4 and Comparative Examples 1–4 were respectively driven by applying DC voltages at two levels of +10 volts and −10 volts with respect to a reference voltage to different pixels so that adjacent two pixels assumed bright and dark states, respectively. Then, the voltage application was stopped, and the respective devices were left standing in the respective memory states for 148 hours.

Thereafter, the respective devices were evaluated with respect to several items. The results are summarized in the following Table 2.

assumed either a bright or dark state in uniform states and a twist state region was formed between two pixels of respectively in bright and dark states in the uniform states. With lapse of time, however, the uniform states in the pixels collapsed and was gradually transformed into the twist state.

In contrast thereto, in the devices of Examples 1–4, a twist state region and disclinations were formed between adjacent two pixels in the bright and dark states respectively, and a good bookshelf structure were retained at the pixels in the memory state even after left standing for the long period.

Thereafter, the devices of Examples 1–4 were subjected to DC voltage application so as switch the dark and bright pixels into bright and dark pixels, respectively, whereby the pixels were quickly switched in these devices.

Comparative Example 5

A liquid crystal device was prepared in the same manner as in Example 1 except that the blank cell therefor was prepared by disposing a pair of substrates so that their rubbing directions were identical to each other.

In the thus-prepared device, the uniform state once formed collapsed and was gradually transformed into a twist state when left standing for a long period in the memory state.

Comparative Example 6

A liquid crystal device was prepared in the same manner as in Example 1 except that the blank cell therefor was prepared by disposing a pair of substrates so that their rubbing directions crossed each other at an angle of 5 degrees and were mutually opposite to each other.

Also in the thus-prepared device, the uniform state once formed collapsed and was gradually transformed into a twist state when left standing for a long period in the memory state.

EXAMPLE 5

A liquid crystal device was prepared in a similar manner as in Example 1 except that ITO electrodes were formed to be accompanied with minute unevenness, so that the device could be driven for gradational display by applying gradational display signals to the ITO electrodes.

The liquid crystal may be incorporated in a display apparatus as illustrated in FIG. 17, and may be driven for

TABLE 2

|  |  | Disclination | LC material | Spontaneous polarization (Ps) | Helical winding direction | Direction of Ps at substrate boundaries | Pixel alignment state in memory state |
|---|---|---|---|---|---|---|---|
| Example | 1 | yes | A | negative | left | outward | oblique bookshelf |
|  | 2 | yes | B | positive | left | inward | oblique bookshelf |
|  | 3 | yes | C | negative | right | inward | oblique bookshelf |
|  | 4 | yes | D | positive | right | outward | oblique bookshelf |
| Comp. Example | 1 | none | A | negative | left | inward | twist over whole area |
|  | 2 | none | B | positive | left | outward | twist over whole area |
|  | 3 | none | C | negative | right | outward | twist over whole area |
|  | 4 | none | D | positive | right | inward | whole area whole area |

As shown in Table 2, in any of the devices of Examples 1–4 and Comparative Examples 1–4, the respective pixels gradational display according to a method as described in detail in U.S. Pat. No. 4,796,980, issued to Kaneko, et al.

Referring to FIG. 17, a liquid crystal device (display panel) 100 as prepared above is connected to two drive circuits for supplying gradational display signals to ITO electrodes on one and the other substrate, respectively, of the liquid crystal device. The drive circuits are controlled by a control circuit, which in turn is controlled by an external host computer.

In an actual drive, a pixel of the liquid crystal device provided therewithin a gradational display state 900 as shown which included a dark domain 901 in one stable state, a bright domain 903 in the other stable state and a twist state region 902 in a twist state as described hereinabove. Between the twist state region 902 and two stable state regions 901 and 903, disclinations were formed, and such half-tone display states could be stably retained.

What is claimed is:

1. A liquid crystal device comprising a pair of substrates and a ferroelectric liquid crystal layer disposed between the substrates; said ferroelectric liquid crystal layer including a first liquid crystal region in a first uniform state wherein liquid crystal molecules assume one stable state, a second liquid crystal region in a second uniform state wherein liquid crystal molecules assume another stable state, and a third liquid crystal region in a twist state disposed between the first and second liquid crystal regions; wherein liquid crystal molecules at both substrate boundaries have mutually opposite pre-tilt directions, and a disclination is formed between the first and second liquid crystal regions, wherein said disclination is disposed within pixels.

2. A liquid crystal device comprising a pair of substrates and a ferroelectric liquid crystal layer disposed between the substrates, said ferroelectric liquid crystal layer including a first liquid crystal region in a first uniform state wherein liquid crystal molecules assume one stable state, a second liquid crystal region in a second uniform state wherein liquid crystal molecules assume another stable state, and a third liquid crystal region in a twist state disposed between the first and second liquid crystal regions, wherein said liquid crystal layer has an oblique bookshelf alignment structure and a disclination is formed between the first and second liquid crystal regions, said disclination being disposed within pixels.

3. A device according to claim 2, wherein said liquid crystal has a negative spontaneous polarization, a left-handed helical winding and is aligned to have outwardly directed spontaneous polarizations at both substrate boundaries.

4. A device according to claim 2, wherein said liquid crystal has a positive spontaneous polarization, a left-handed helical winding and is aligned to have inwardly directed spontaneous polarizations at both substrate boundaries.

5. A device according to claim 2, wherein said liquid crystal has a negative spontaneous polarization, a right-handed helical winding and is aligned to have inwardly directed spontaneous polarizations at both substrate boundaries.

6. A device according to claim 2 wherein said liquid crystal has a positive spontaneous polarization, a right-handed helical winding and is aligned to have outwardly directed spontaneous polarizations at both substrate boundaries.

7. A liquid crystal device, comprising a pair of substrates and a ferroelectric liquid crystal layer disposed between the substrates in a thickness small enough to suppress a helical structure of the ferroelectric liquid crystal; said ferroelectric liquid crystal layer including a first liquid crystal region in a first uniform state wherein liquid crystal molecules assume one stable state, a second liquid crystal region in a second uniform state wherein liquid crystal molecules assume another stable state, and a third liquid crystal region in a twist state disposed between the first and second liquid crystal regions; wherein liquid crystal molecules at both substrate boundaries have mutually opposite pre-tilt directions, and a disclination is formed between the first and second liquid crystal regions; said liquid crystal having a negative spontaneous polarization, a left-handed helical winding and being aligned to have outwardly directed spontaneous polarizations at both substrate boundaries.

8. A device liquid crystal, comprising a pair of substrates and a ferroelectric liquid crystal layer disposed between the substrates in a thickness small enough to suppress a helical structure of the ferroelectric liquid crystal; said ferroelectric liquid crystal layer including a first liquid crystal region in a first uniform state wherein liquid crystal molecules assume one stable state, a second liquid crystal region in a second uniform state wherein liquid crystal molecules assume another stable state, and a third liquid crystal region in a twist state disposed between the first and second liquid crystal regions; wherein liquid crystal molecules at both substrate boundaries have mutually opposite pre-tilt directions, and a disclination is formed between the first and second liquid crystal regions; said liquid crystal having a positive spontaneous polarization, a left-handed helical winding and being aligned to have inwardly directed spontaneous polarizations at both substrate boundaries.

9. A liquid crystal device, comprising a pair of substrates and a ferroelectric liquid crystal layer disposed between the substrates in a thickness small enough to suppress a helical structure of the ferroelectric liquid crystal; said ferroelectric liquid crystal layer including a first liquid crystal region in a first uniform state wherein liquid crystal molecules assume one stable state, a second liquid crystal region in a second uniform state wherein liquid crystal molecules assume another stable state, and a third liquid crystal region in a twist state disposed between the first and second liquid crystal regions; wherein liquid crystal molecules at both substrate boundaries have mutually opposite pre-tilt directions, and a disclination is formed between the first and second liquid crystal regions; said liquid crystal having a negative spontaneous polarization, a right-handed helical winding and being aligned to have inwardly directed spontaneous polarizations at both substrate boundaries.

10. A liquid crystal device, comprising a pair of substrates and a ferroelectric liquid crystal layer disposed between the substrates in a thickness small enough to suppress a helical structure of the ferroelectric liquid crystal; said ferroelectric liquid crystal layer including a first liquid crystal region in a first uniform state wherein liquid crystal molecules assume one stable state, a second liquid crystal region in a second uniform state wherein liquid crystal molecules assume another stable state, and a third liquid crystal region in a twist state disposed between the first and second liquid crystal regions; wherein liquid crystal molecules at both substrate boundaries have mutually opposite pre-tilt directions, and a disclination is formed between the first and second liquid crystal regions; said liquid crystal having a positive spontaneous polarization, a right-handed helical winding and being aligned to have outwardly directed spontaneous polarizations at both substrate boundaries.

11. A device according to any of claims 1, 2, or 7–10, wherein a mutually adjacent pair of liquid crystal molecules among liquid crystal molecules surrounding said disclination have substantially equal spontaneous polarization vector angles.

12. A device according to any of claims 1, 2, or 7–10, wherein said disclination is linear.

13. A device according to any of claims 1, 2, or 7–10, wherein said liquid crystal is in an alignment state satisfying: $\widehat{H}-\delta<\alpha<\delta$, wherein $\widehat{H}$ denotes a cone angle of liquid crystal molecules, $\delta$ denotes a smectic layer inclination angle, and $\alpha$ denotes a pretilt angle.

14. A liquid crystal device, comprising a pair of substrates and a ferroelectric liquid crystal layer disposed between the substrates; said ferroelectric liquid crystal layer including a first liquid crystal region in a first uniform state wherein liquid crystal molecules assume one stable state, a second liquid crystal region in a second uniform state wherein liquid crystal molecules assume another stable state, and a third liquid crystal region in a twist state disposed between the first and second liquid crystal regions; wherein liquid crystal molecules at both substrate boundaries have mutually opposite pre-tilt directions, and a disclination is formed along with the third twist state region between the first and second liquid crystal regions formed at adjacent pixels, respectively;

wherein said liquid crystal has a negative spontaneous polarization, a left-handed helical winding and is aligned to have outwardly directed spontaneous polarizations at both substrate boundaries.

15. A liquid crystal device, comprising a pair of substrates and a ferroelectric liquid crystal layer disposed between the substrates; said ferroelectric liquid crystal layer including a first liquid crystal region in a first uniform state wherein liquid crystal molecules assume one stable state, a second liquid crystal region in a second uniform state wherein liquid crystal molecules assume another stable state, and a third liquid crystal region in a twist state disposed between the first and second liquid crystal regions; wherein liquid crystal molecules at both substrate boundaries have mutually opposite pre-tilt directions, and a disclination is formed along with the third twist state region between the first and second liquid crystal regions formed at adjacent pixels, respectively;

wherein said liquid crystal has a positive spontaneous polarization, a left-handed helical winding and is aligned to have inwardly directed spontaneous polarizations at both substrate boundaries.

16. A liquid crystal device, comprising a pair of substrates and a ferroelectric liquid crystal layer disposed between the substrates; said ferroelectric liquid crystal layer including a first liquid crystal region in a first uniform state wherein liquid crystal molecules assume one stable state, a second liquid crystal region in a second uniform state wherein liquid crystal molecules assume another stable state, and a third liquid crystal region in a twist state disposed between the first and second liquid crystal regions; wherein liquid crystal molecules at both substrate boundaries have mutually opposite pre-tilt directions, and a disclination is formed along with the third twist state region between the first and second liquid crystal regions formed at adjacent pixels, respectively;

wherein said liquid crystal has a negative spontaneous polarization, a right-handed helical winding and is aligned to have inwardly directed spontaneous polarizations at both substrate boundaries.

17. A liquid crystal device, comprising a pair of substrates and a ferroelectric liquid crystal layer disposed between the substrates; said ferroelectric liquid crystal layer including a first liquid crystal region in a first uniform state wherein liquid crystal molecules assume one stable state, a second liquid crystal region in a second uniform state wherein liquid crystal molecules assume another stable state, and a third liquid crystal region in a twist state disposed between the first and second liquid crystal regions; wherein liquid crystal molecules at both substrate boundaries have mutually opposite pre-tilt directions, and a disclination is formed along with the third twist state region between the first and second liquid crystal regions formed at adjacent pixels, respectively;

wherein said liquid crystal has a positive spontaneous polarization, a right-handed helical winding and is aligned to have outwardly directed spontaneous polarizations at both substrate boundaries.

18. A liquid crystal device, comprising:

a pair of substrates and a ferroelectric liquid crystal layer disposed between the substrates in a thickness small enough to suppress a helical structure of the ferroelectric liquid crystal, said ferroelectric liquid crystal layer including a first liquid crystal region in a first uniform state wherein liquid crystal molecules assume one stable state, a second liquid crystal region in a second uniform state wherein liquid crystal molecules assume another stable state, and a third liquid crystal region in a twist state disposed between the first and second liquid crystal regions; and a disclination formed between the first and second liquid crystal regions, wherein liquid crystal molecules at both substrate boundaries have mutually opposite pre-tilt directions, and a mutually adjacent pair of liquid crystal molecules among liquid crystal molecules surrounding said disclination have substantially equal spontaneous polarization vector angles.

19. A device according to claim 18, wherein said disclination is disposed between pixels.

20. A display apparatus, comprising: a liquid crystal device according to claim 18, a drive circuit for driving the device, and a control circuit for controlling the drive circuit.

* * * * *

UNITED STATES PATENT AND TRADEMARK OFFICE
CERTIFICATE OF CORRECTION

PATENT NO. : 5,754,265

DATED : May 19, 1998

INVENTOR(S) : YUTAKA INABA

It is certified that error appears in the above-identified patent and that said Letters Patent is hereby corrected as shown below:

ON THE TITLE PAGE AT [57] ABSTRACT
    Line 7, "wherein," should read --wherein--.

COLUMN 1
    Line 9, "in an" should read --in a--;
    Line 48, "as shown" should read --is shown--;
    Line 49, "state but" should read --state, but--.

COLUMN 2
    Line 14, "in case" should read --in a case--;
    Line 16, "in case" should read --in a case--;
    Line 18, "in" should be deleted.

COLUMN 4
    Line 66, "In case" should read --In a case--.

COLUMN 5
    Line 45, "in case" should read --in a case--.

COLUMN 6
    Line 28, "stabilize" should read --stabilizes--;
    Line 33, "In case" should read --In the case--.

COLUMN 7
    Line 16, "when" should be deleted;
    Line 62, "In case" should read --In a case--.

COLUMN 8
    Line 21, "such a" should read --such as a--.
    Line 59, "angles" should read --angles of--.

UNITED STATES PATENT AND TRADEMARK OFFICE
CERTIFICATE OF CORRECTION

PATENT NO. : 5,754,265

DATED : May 19, 1998

INVENTOR(S) : YUTAKA INABA

It is certified that error appears in the above-identified patent and that said Letters Patent is hereby corrected as shown below:

<u>COLUMN 9</u>
    Line 11, "whole" should read --the whole--;
    Line 32, "When such" should read --Such--.

<u>COLUMN 10</u>
    Line 29, "adjacent two" should read --two adjacent--.

<u>COLUMN 12</u>
    Table 2, "whole area" should read --twist over--;
    Line 2, "of" should be deleted;
    Line 5, "was" should read --were--;
    Line 7-8, "adjacent two" should read --two adjacent--;
    Line 9, "were" should read --was--;
    Line 10, "left" should read --beiupleft--;
    Line 12, "as" should read --as to--.

<u>COLUMN 13</u>
    Line 9, "therewithin" should read --therein--.
    Line 57, "2" should read --2,--

<u>COLUMN 14</u>
    Line 12, "device liquid crystal" should read --liquid crystal device--.

Signed and Sealed this

Sixteenth Day of February, 1999

Attest:

Attesting Officer

*Acting Commissioner of Patents and Trademarks*